J. McCABE.
NUT LOCK.
APPLICATION FILED JAN. 24, 1918.
1,372,525.
Patented Mar. 22, 1921.
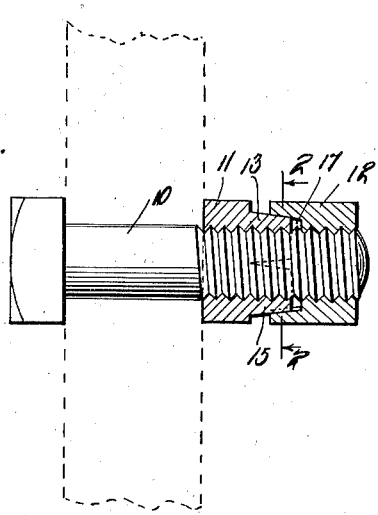
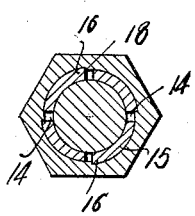
WITNESSES
W. C. Fielding.
Wm Seaman
INVENTOR
James McCabe
BY Richard B. Owen.
ATTORNEY

UNITED STATES PATENT OFFICE.

JAMES McCABE, OF JAMESTOWN, NORTH DAKOTA.

NUT-LOCK.

1,372,525.  Specification of Letters Patent.  Patented Mar. 22, 1921.

Application filed January 24, 1918. Serial No. 213,569.

*To all whom it may concern:*

Be it known that I, JAMES MCCABE, a citizen of the United States, residing at Jamestown, in the county of Stutsman and State of North Dakota, have invented certain new and useful Improvements in Nut-Locks, of which the following is a specification.

This invention has relation to nut locks, and has for an object to provide a member for coaction with a threaded bolt including a pair of sections, each for threaded engagement with the bolt, and adapted for mutual frictional engagement whereby to bind the sections of the member upon the bolt, to prevent separation thereof.

Another object of the invention is to provide means for coacting with a threaded bolt including one member to receive the bolt having a conical threaded extension, and a second member for threaded engagement with the bolt having a recess to receive the conical member whereby the members may be rotated upon the bolt for mutual engagement to bind said members upon the bolt to prevent separation thereof.

A still further object of the invention is to provide a nut lock of the character above set forth designed with a view to insuring firm frictional engagement of the nut upon the bolt without mutilating the threads of the bolt in any manner whatsoever.

A still further object of the invention is to provide a nut lock of the character above set forth which is simple in construction, and which may be manufactured at a small cost.

In addition to the foregoing my invention comprehends improvements in the details of construction and arrangement of the correlative parts to be hereinafter more fully described and particularly set forth in the appended claim.

In the accompanying drawings in which similar and corresponding parts are designated by the same characters of reference throughout the several views in which they appear:

Figure 1, is a view in longitudinal section of the coacting members of my improved nut lock, illustrating the same applied to a threaded bolt.

Fig. 2 is a transverse section taken on the line 2—2 of the preceding figure.

With reference to the drawings, 10 indicates a conventional type of threaded bolt, and 11 and 12 indicate a binding nut and jam nut respectively and constructed in accordance with my invention.

As shown in Figs. 1 and 2 of the drawings, the binding nut 11 is formed upon one terminal with a conical extension 13, split longitudinally and at uniformly spaced points, to form slots 14 having upwardly diverging sides whereby to define a plurality of tongues 15. The tongues of the extensions and also the nut are interiorly threaded to engage the threads of the bolt, and it will be noted that one lateral edge of each tongue 15 is thicker than its opposite edge as indicated at 16, each tongue tapering circumferentially for a purpose which will be presently designated.

The member 12 is formed upon one face with a conical recess 17 to receive the conical extension 13, and the wall of said recess 17 is notched at uniformly spaced points as at 18.

In use, the member 11 is threaded upon the bolt and in a manner so that when the member 12, is threaded upon the bolt, the recess 17, thereof, will receive the conical extension 13. The member 12 is rotated subsequent to the introduction of the conical member 13 in the recess so as to bind the tongues 15, which are flexed and held in frictional engagement with the threads of the bolt, the section edges 16 of the tongues engaging behind the notches 18 of the member 12 whereby to prevent reverse rotation of said member 12 relative to the member 11. It will be noted that the tongues 15 bear against the threads of the bolts uniformly throughout their width and present no edges to dig into the threads of the bolts thereby preventing mutilation thereof. The members 11 and 12 will be securely held to the bolt against casual displacement.

I desire to call particular attention to the fact that the tongues 15 taper circumferentially from end to end, to present a smooth interior surface for engagement with the threaded bolt whereby to frictionally engage the bolt without mutilating the same.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claim.

Having thus described my invention, what I claim as new and desire to secure by Letters Patent is:—

In a nut lock, a threaded member, a binding nut on the threaded member and having a conical extension on its outer face longitudinally slotted to form a plurality of tongues which circumferentially taper, whereby to provide a thickened edge on each of said tongues, and a locking nut on the threaded member having a conical recess in its inner face to receive the conical extension of the binding nut and having grooves in the walls of the recess to receive the outer corners of the thickened edges of the tongues and prevent relative backward rotation of the two nuts, said locking nut constituting a compression member to force the thickened edges of the tongues into the material of the threaded member upon rotation in one direction relative to the binding nut.

In testimony whereof I affix my signature in presence of two witnesses.

JAMES McCABE.

Witnesses:
 L. AYLMER,
 E. L. HAUSER.